Feb. 14, 1967 R. H. BURGESS 3,304,057
ROTARY FLUID MOTOR
Filed May 18, 1964 4 Sheets-Sheet 1

INVENTOR
ROBERT HENRY BURGESS

INVENTOR
ROBERT HENRY BURGESS
BY McGlew and Toren,
Attorneys

Feb. 14, 1967  R. H. BURGESS  3,304,057
ROTARY FLUID MOTOR

Filed May 18, 1964  4 Sheets-Sheet 4

INVENTOR
ROBERT HENRY BURGESS

3,304,057
ROTARY FLUID MOTOR
Robert Henry Burgess, 259 Hume Highway, South
Strathfield, New South Wales, Australia
Filed May 18, 1964, Ser. No. 368,096
9 Claims. (Cl. 253—96)

The present invention relates to a means for utilizing the kinetic energy of a liquid or other fluid for producing a rotary motion.

The invention may be utilized to provide a relatively simple and inexpensive means for producing a rotary motion from a stream of fluid and is of particular utility in producing very slow rate of rotation. The range of uses to which the invention may be put is wide and some of these are explained in detail below in connection with various specific embodiments of the invention.

The invention consists in a means for utilizing the kinetic energy of a fluid, having a stator and a rotor, arranged so as to define between them an annular space the radial width of which is restricted over a portion of its axial length, the rotor being mounted so as to be freely rotatable about the axis of said annular space and so as to be free to tilt or rock about a point on or close to said axis, the construction being such that fluid may be passed through said annular gap to cause rotation of the rotor.

Figure 13:
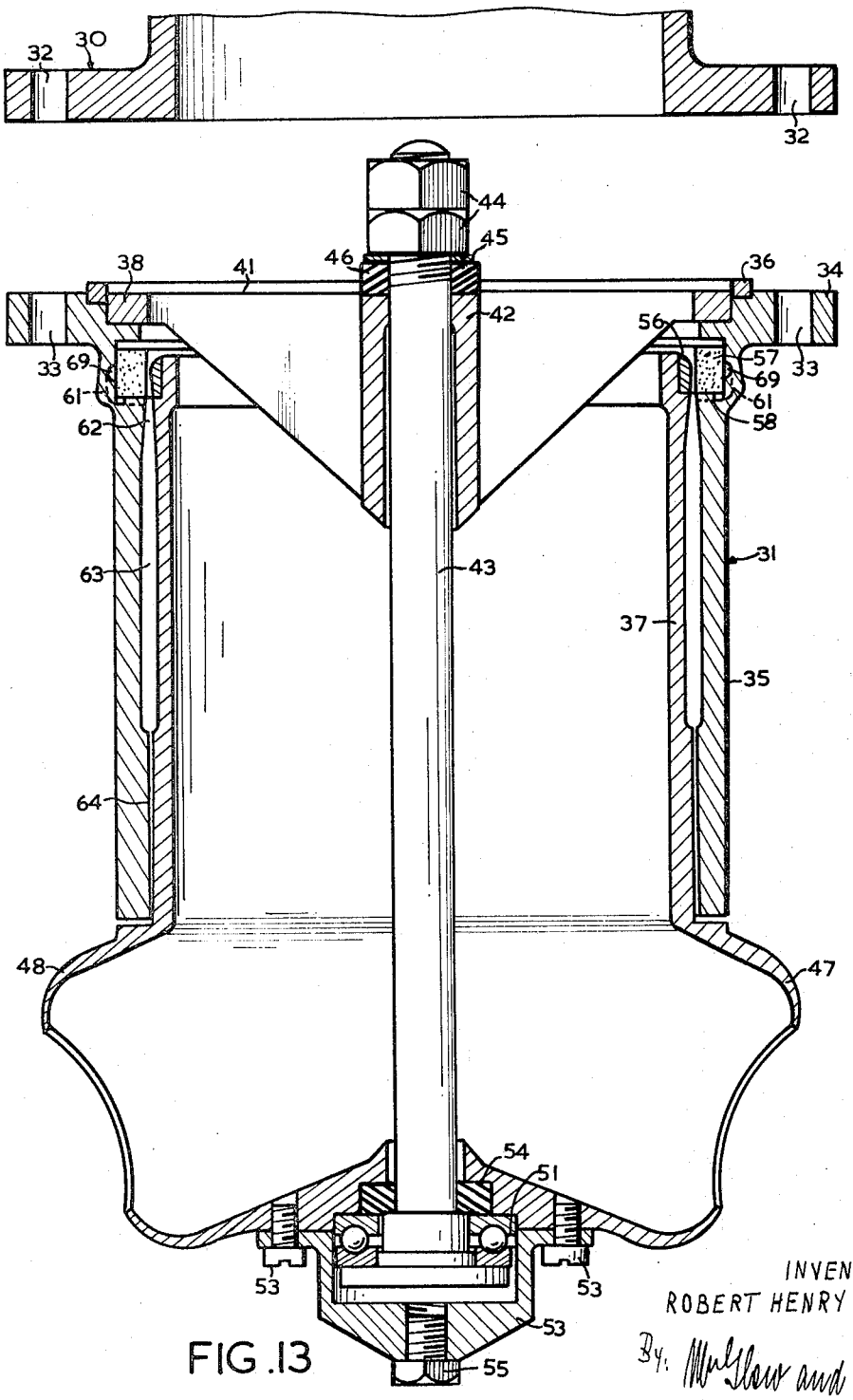
Figure 14:
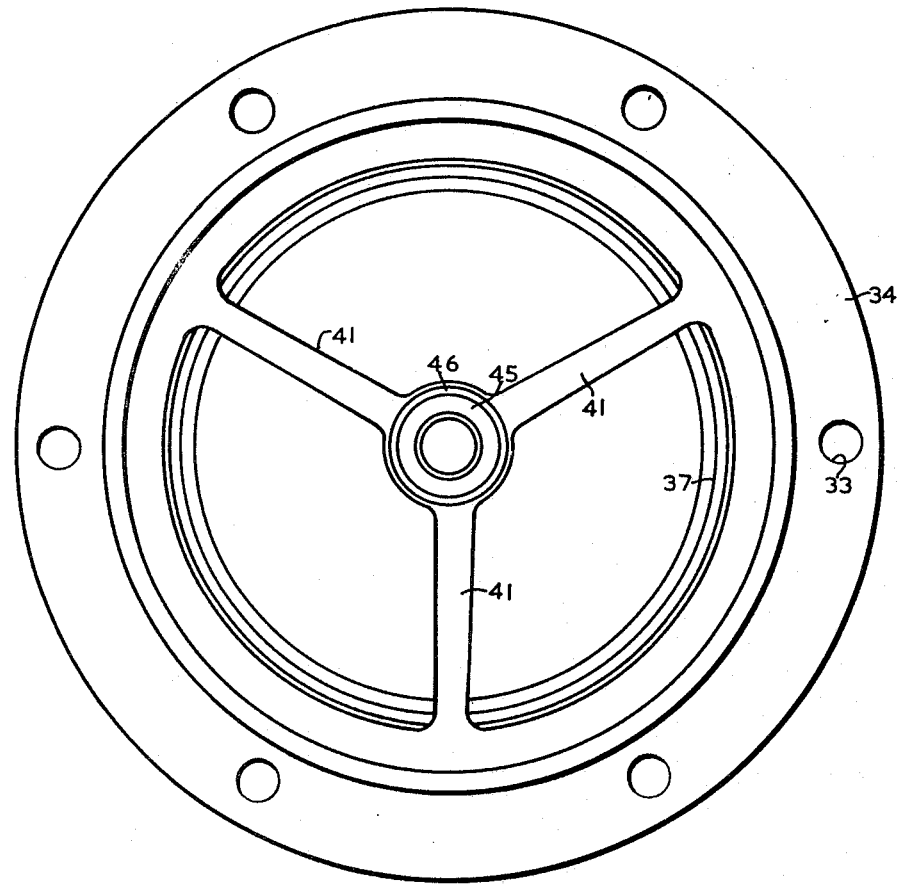
Figure 15:
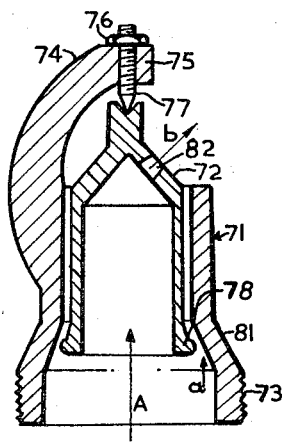
Figure 16:
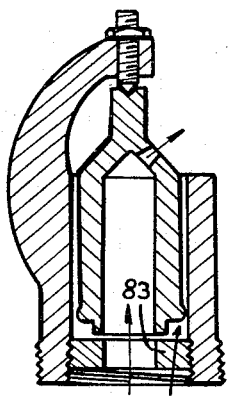
Figure 17:
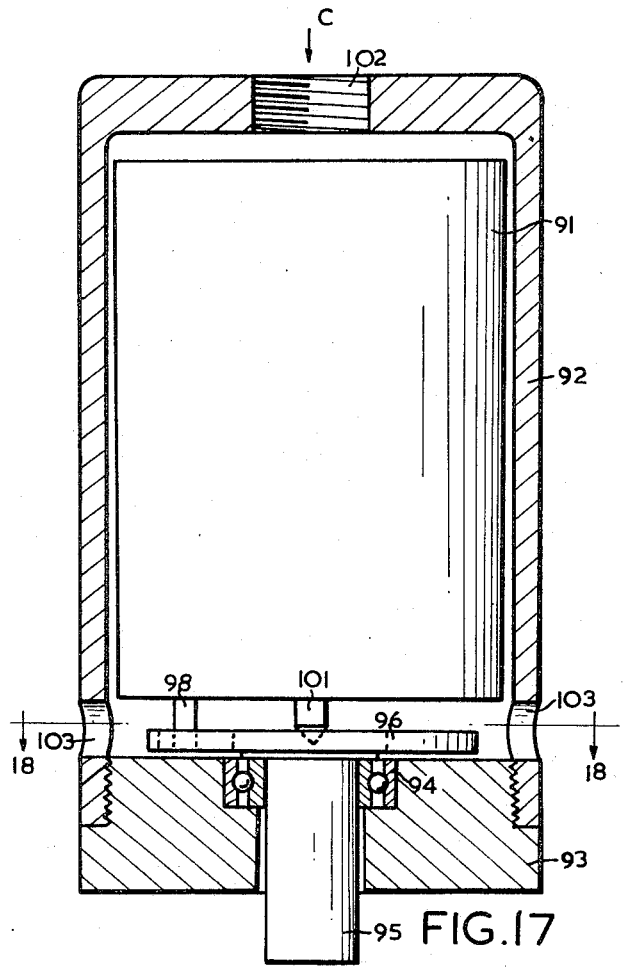
Figure 18:
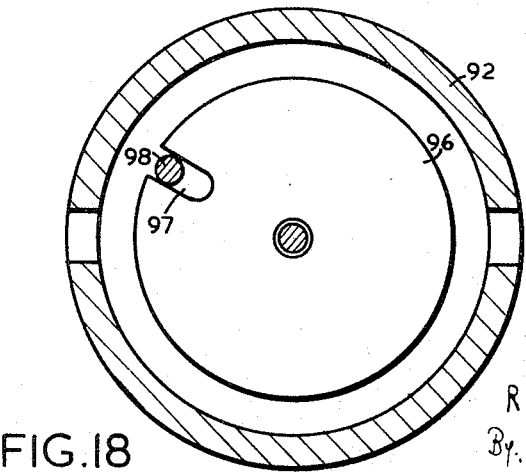

In order that the invention may be better understood and put into practice preferred forms thereof are hereinafter described by way of example, with reference to the accompanying drawings, in which:

FIGS. 1 to 12 are diagrammatic illustrations of various forms of the invention,

FIG. 13 is a sectional elevation of a form of the invention which produces rotating jets of water and is intended for purposes such as the loosening of sand or gravel from the bed of a river, FIG. 14 is a plan view of the apparatus shown in FIG. 13, FIG. 15 is a sectional elevation of a form of the invention in which the invention is applied to a rotating water sprinkler, FIG. 16 is a sectional elevation of a variation of the construction shown in FIG. 15, FIG. 17 is a sectional elevation of a further form of the invention intended for operation by air or gas pressure, and FIG. 18 is a sectional plan view on line 18—18 of FIG. 17.

FIGS. 1 to 12 are purely diagrammatic and are intended to illustrate various ways in which the invention may be applied and more particularly to illustrate various ways in which the rotor and stator may be arranged in relation to each other. In each of these figures the rotor is designated by *r* and the stator by *s*.

Figure 1:
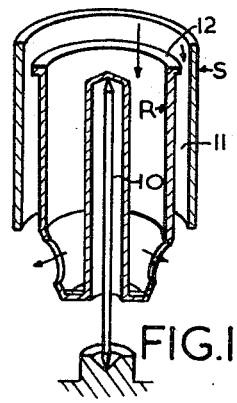

In FIG. 1 the rotor is arranged within the stator and is supported for rotation about the common axis of the rotor and the stator by means of the pivot pin 10 which lies on that axis and which supports the rotor in such a manner that it is free to tilt or rock slightly about the pivot point.

The internal cylindrical bore of the stator and the external cylindrical surface of the rotor are parallel when the rotor is in the position shown and define between them an annular space 11 through which fluid moving in the direction of the arrows may pass. The width of the space 11 is restricted at its upper end by the flange 12 and it is the passage of fluid through the narrow space between the flange 12 and the inner wall of the stator which causes the rotor to rotate. This phenomenon is described in more detail below. It should be noted, however, that in this figure and in FIGS. 2 to 12 the relative proportions of the parts are not correct, for example, the space between the stator and the rotor is shown disproportionately large for the sake of clarity.

This form of the invention provides, as do those forms shown in FIGS. 2 to 7, a means of producing rotating jets of fluid and is not intended to provide a source of power. The embodiments shown in FIGS. 8 to 12 however are provided with a power take-off shaft.

Figure 2:
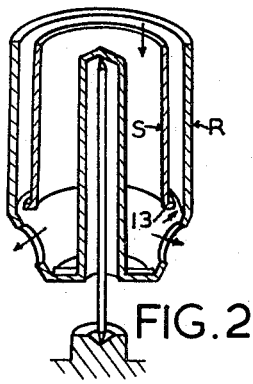

In FIG. 2 the arrangement differs from that shown in FIG. 1 principally due to the fact that the stator is arranged within the rotor and is provided at its lower end with a flange 13 which provides the necessary restriction in the width of the passage between the stator and the rotor.

Figure 3:
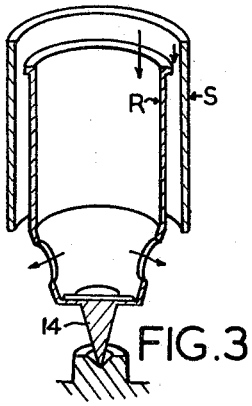

In FIG. 3 the arrangement is similar to that of FIG. 1 with the exception that the rotor is supported at its lower end by the pivot 14. In this arrangement the pivot point for the rotor, as in the previous examples, is on the common axis of the rotor, the cylindrical bore of the stator and the annular space defined between them and the rotor is free to tilt slightly about the pivot point.

Figure 4:
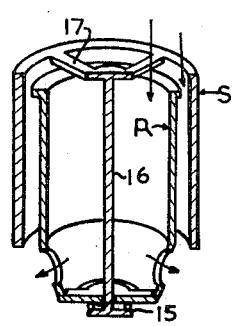

FIG. 4 shows an arrangement which is essentially the same as that shown in FIG. 3, the difference lying in the fact that the rotor is supported by means of a ball bearing 15 carried on a stem 16 depending from the spider 17 attached to the stator. The ball bearing 15 is constructed and arranged to allow the rotor to tilt slightly.

Figure 5:
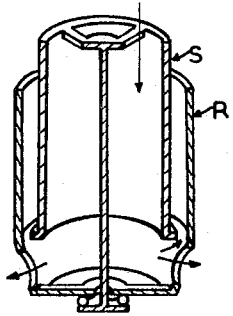

The arrangement shown in FIG. 5 is similar to that shown in FIG. 2 except that the rotor is suspended in the manner described in connection with FIG. 4.

Figure 6:
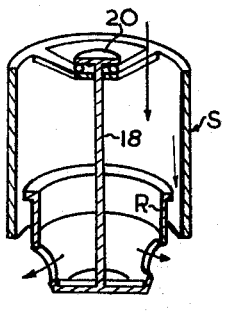

In FIG. 6 the rotor is considerably shorter than the stator and is hung by means of the stem 18 from a ball bearing 20.

Figure 7:
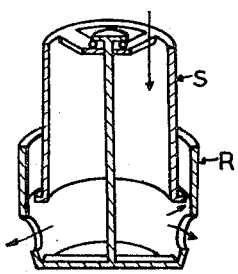

In FIG. 7 the rotor is supported in the same manner as in FIG. 6 but is arranged outside the stator instead of inside it.

Figure 8:
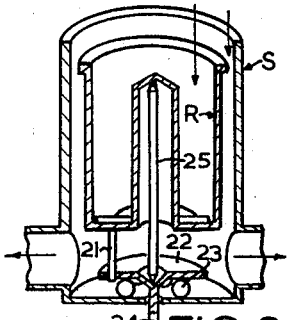

In the arrangement shown in FIG. 8 the rotor is supported in a manner similar to that shown in FIG. 1 but has attached to its lower end a pin 21 which engages a plate 22 supported on a ball bearing 23 and attached to an output shaft 24. It will be seen that the pivot 25 is supported on the plate 22 and that the arrangement is such that as the rotor rotates its rotary movement is transmitted to the shaft 24 thus allowing rotational power to be taken from the device. Fluid enters in the direction of the upper arrow and leaves in the direction of the two lower arrows.

Figure 9:
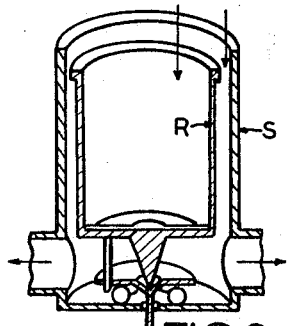

The arrangement shown in FIG. 9 is essentially the same as that shown in FIG. 8 except that the rotor is supported by substantially the same means as in FIG. 3.

Figure 10:
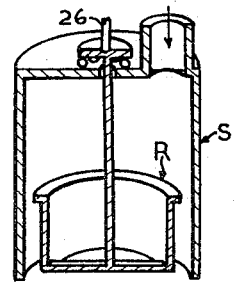

In the arrangement shown in FIG. 10 the stator and rotor are arranged in much the same manner as in FIG. 6 except that the output shaft 26 is available to enable power to be taken from the device.

Figure 11:
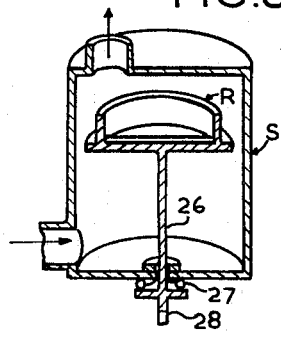

In FIG. 11 the motor is completely surrounded by the stator through which fluid flows from the bottom to the top, the rotor being supported on a flexible shaft 26. The thrust on the rotor produced by the flow of fluid is taken by the ball bearing 27 and power may be taken from the rotor by means of the extension 28.

Figure 12:
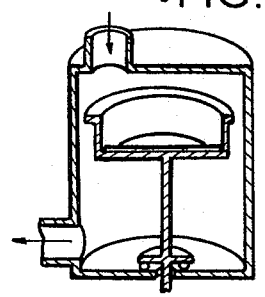

The arrangement shown in FIG. 12 is basically similar to that shown in FIG. 11 with the exception that the flow of fluid through the stator is from the top to the bottom. In these last two embodiments it will be seen that the provision of the flexible shaft 26 allows the rotor to tilt in much the same way as with the forms of suspension used in the embodiments described in the other figures.

Whereas in FIGS. 1 to 12 the axis of rotation is shown as being vertical, it is not necessary that this should be so. For example, the axis of rotation may be horizontal and it has been found that in this case the rotor may be given a bias to cause it to rotate in one sense in preference to the other by offsetting the pivot point of the rotor very slightly from the axis of the cylinder bore of the stator. The degree of offset needs to be only a few thousandths of an inch and has the advantage of ensuring that every time it is started the rotor will rotate in the same direction. It will be appreciated that in an entirely symmetrical arrangement the rotor may start to rotate in either direction according to the precise conditions prevailing at the moment of starting. While in some applications this will not matter, in others it would be inconvenient.

Whereas FIGS. 1 to 12 are purely diagrammatic, FIGS. 13 and 14 show in some detail a particular application of the invention. The device shown in these figures is a nozzle for a hose through which water is passed under pressure, the nozzle, by utilization of the invention, providing two slowly rotating jets of water. Such a nozzle has been found to be of great value in removing loose material such as sand, gravel or the like from the bed of a river or pond for subsequent removal.

In FIG. 13 which is approximately full size, is shown a flange 30 which is attached to the end of the hose and to which the nozzle 31 may be bolted by means of the holes 32 on the fitting and the holes 33 in a flange 34 formed on the stator 35. Suitable bolts are passed through the holes 32 and 33 to clamp the nozzle to the fitting. A rubber or other suitable sealing ring 36 seals the joint between the two. The rotor 37 is supported in the stator by means of a support ring 38 which rests on a shoulder in the stator 35 and is connected by webs 41 to a central boss 42. Through a bore in the boss 42 passes a shaft 43 on which the rotor 37 is supported. The shaft is held in position by means of the nuts 44 which bear on a washer 45 supported on a rubber grommet 46. It should be noted that whereas the clearance between the shaft 43 and the upper part of the boss 42 is relatively small, for example .005 inch, there is a greater clearance between the lower portion of the boss 42 and the shaft 43, for example of .060 inch, to allow for lateral movement of the shaft which takes place when the rotor tilts. The rotor 37 is substantially cylindrical in shape and has at its lower end two jet orifices 47 and 48. The rotor is supported at its lower end by means of the thrust race 51 which is protected by means of the cover 52 attached by screws 53 to the rotor. The thrust race is sealed at its upper side by means of the rubber seal 54. A lubrication plug 55 is provided in the bottom of the cover 52.

At the upper end of the rotor 37 is arranged a metal wear ring 56 having an outside diameter of 4.242 inches. This is surrounded by a composition wear ring 57 supported on a shoulder 58 in the stator, the ring 57 having an internal bore of 4.250 inches. The wear ring 56 should preferably be of a very hard corrosion resistant substance but in practice this is difficult and expensive to produce and it has been found preferable to make it of brass and replace it from time to time. The composition of the wear ring 57 is made preferably from rubber heavily loaded with graphite. The external surface of the rotor 37 and the interior of the bore of the stator 35 are shaped to provide a collecting cavity for liquid which has passed through the restricted portion of the annular space between the two wear rings described above. Over the major portion of this cavity below the throat 62 the outside diameter of the rotor is 4.145 inches and the internal diameter of the bore is 4.400 inches. Below the collecting cavity there is a second restricted portion of the annular space between the rotor and the stator the outside diameter of the rotor over this portion being 4.230 inches and the bore of the stator being 4.250 inches. The purpose of this second restricted portion is discussed below.

With the arrangement described above, if water is applied at 35 lbs. per square inch approximately 500 gallons per minute of water will be supplied to the two jet orifices and 12 gallons per minute will flow through the clearance between the rotor and the stator and with the dimensions given above this will give a rate of rotation of the jet orifices of about 16 revolutions per minute. The effect of altering the clearances between the different parts of the rotor and the stator is discussed below.

While specified dimensions are given above it should be understood that these are only by way of example and to assist in understanding the invention and one manner in which it may be applied.

FIG. 15 shows a rotating water sprinkler intended for attachment to the end of a hose or to an agricultural pipe line. The construction consists of a stator 71 and a rotor 72, the stator being provided with a screw thread 73 at its lower end by means of which it may be mounted, for example, on the water supply pipe of an agricultural irrigation system and being provided at its upper end with an arm 74 which carries a screw 75 supported by an adjusting nut 76. The screw 75 is formed at its lower end with a point 77 which provides a pivot for the upper end of the rotor 72. The rotor 72 is provided with an outer cylindrical wall which lies within a cylindrical bore formed in the stator 71 so as to define an annular space between them. A flange 78 formed on the lower end of the rotor lies adjacent a frusto-conical surface 81 formed over the lower portion of the bore of the stator. In use water is supplied in the direction of the arrows A and a, the former indicating that part of the water flow which passes through the jet orifice 82 in the direction of the arrow b. The pressure of the water on the interior of the rotor holds it against the point of the screw 75 which constitutes the pivot point for the rotor about which it can rotate and tilt slightly.

The jet orifice is caused to rotate by the action of the water passing in the direction of the arrow a through the clearance between the stator and the rotor. The speed of rotation may be adjusted by adjusting the position of the locking nut 76 and thereby adjusting the effective clearance between the flange 78 and the frusto-conical surface 81 which bound the restricted portion of the annular space between the rotor and the stator.

The arrangement shown in FIG. 16 is in most respects the same as that shown in FIG. 15, the difference lying in the fact that the bore of the rotor is parallel sided throughout and adjustment of the rate of flow between the rotor and the stator is effected by the adjustment of the clearance between the rotor and the threaded ring 83 screwed into the base of the stator; this in turn alters the rate of rotation of the rotor by controlling the volume of water passing through the annular space between the rotor and the stator.

FIGS. 17 and 18 show a small air motor operating according to the invention; in this construction a rotor 91 is surrounded by a stator casing 92, and the lower end of which is closed by a closure 93 screwed into the end of the stator 92. The closure member is provided with a roller bearing 94 which supports an output shaft 95 having at its upper end a flange 96. The flange 96 is provided with a radial groove 97 in which engages a dog 98 attached to the lower end of the rotor 91. The rotor 91 is supported on the flange 96 by means of the pivot pin 101 which is received in a central depression in the upper surface of the flange at its centre.

Air is admitted in the direction of the arrow c through the admission port 102 and is exhausted through the exhaust ports 103.

In the particular embodiment illustrated there is a radial clearance of .0025 inch between the external surface of the upper end of the rotor and the internal bore of the stator. At the lower end this clearance is increased to .005 inch. With these dimensions it is found that if air is supplied at 100 lbs. per square inch, 2 ft. pounds of torque are obtainable at 40 r.p.m. with a maximum free running speed of about 45 r.p.m. It will be noted that in this form of the invention the restricted portion of the annular space between the stator and the rotor occurs at the top of the latter and that this space gradually widens out.

A further point to note is that owing to the nature of the air motor it can be connected directly to a device to be driven without the intervention of a clutch or gearing and that if any resistance met is greater than the torque available the rotor will simply cease to rotate without any damage being done.

The theoretical basis for the invention is not at present fully understood, although this aspect of it is being investigated. It is believed, however, that the method of operation is as set out below.

It is a well known fact that if a fluid moves rapidly through a venturi orifice a zone of low pressure is generated and the fluid leaves the portion of least area. In a device according to the invention, for example that shown in FIG. 1 when at rest, a portion of the upper edge of the rotor would in practice rest against the bore in the stator and the rotor would not occupy a central position as shown in the figure. The width of the annular space between the rotor and the stator will be greatest at a point diametrically opposite to the point of contact. Now if fluid under pressure is caused to flow through the restricted portion of the annular space between the rotor and the stator a low pressure area will be generated on the downstream side of this restricted portion. This low pressure area will draw the rotor top across the annular space, simultaneously shutting off the fluid flow at that point and allowing fluid flow to commence at the portion that was originally in contact. The same process would then be repeated and the rotor returned to its original position.

However, as in practice the rotor will move only approximately along a diameter of the stator bore it is highly improbable that it will strike the bore radially. In fact it will at some time strike the bore along a chord path and be deflected in such a manner (under the influence of its own inertia and the pull of the depressed area) that after a few oscillations the path of a point on the rotor axis will describe a roughly elliptical path, with the rotor striking the bore at each end of the major axis, or possibly the path may adopt some other shape having more than two impact points with the rotor bore. A point on the rotor circumference will move relative to the stator due to the difference in diameters of the rotor and stator.

A relationship something like $$\frac{C \times 360}{B}$$

degrees relative movement will occur each *rolling* cycle of the rotor, where B is the stator bore and C is the width of the annular space between the rotor and the stator. It will be apparent that many *rolling* cycles will have to occur before any point on the rotor returns to its starting position or in other words many *rolling* cycles will have to occur to cause the rotor to *rotate* one complete revolution.

If we assume the above theory is correct, then for a 4 in. bore with an annular space at the restricted portion having a width of .010

$$\frac{10 \times 360}{4000} = \frac{36}{40}$$

or less than one degree rotation of the rotor for each rolling cycle. Then something like 400 cycles will have to occur before the rotor makes one revolution.

On this basis increasing the width of the annular space to .020 in. would double the degrees of rotation per cycle and of course double the rotational speed, but another effect is felt when the clearance is increased, namely more fluid can flow and greater pressure differences are developed around the rotor, increasing its rate of oscillation and thereby giving much greater speed increase than the formula indicates.

This effect of increased power development, if unwanted can be counteracted to some extent by causing a back pressure to act against the flow of fluid. This is done simply by introducing a second restricted portion at the downstream end of the stator to restrict flow (as in the arrangement shown in FIG. 13). In the above discussion the width of this latter portion has been assumed to be liberal and something of the order of four or five times that of the width of the annular space over the first restricted area.

It has been found in practice that in a device powered by water, a rotor approximately 4½ inches diameter with an annular space having a width of .010 in. over the first restricted portion will give speeds of rotation thus:

|  | R.p.m. |
|---|---|
| Width of annular space over .030" | 36 |
| Second restricted portion— | |
| .025" | 26 |
| .020" | 16 |

In those embodiments of the invention illustrated in FIGS. 2 to 7 which show an arrangement intended to produce rotating jets of fluid, it will be seen that two oppositely arranged outlets are provided which ensure that the thrust produced by the jets is balanced. If it is desired to produce an arrangement similar for example to that shown in FIG. 3 having a single jet, the rotor instead of being supported on a single pivot may have formed around its lower end, above a single outlet orifice, a shoulder which is suitably shaped to form a race for a set of ball bearings arranged in a suitable cage, the other side of the race being constituted by a portion of the lower edge of the stator. Fluid passing between the rotor and stator will pass out between the ball bearings. This arrangement has been found to be quite satisfactory and can handle the unbalanced side thrust created by the single offset outlet orifice.

The embodiments of the invention described above are given by way of example only and a variety of other embodiments may be readily devised within the scope of the invention as defined in the succeeding claims.

It will be noted for example that in all the embodiments of the invention described above, the rotor is arranged so as to be free to tilt or rock about a point on or close to the axis of the annular space. However, it would be quite practicable to mount the rotor on a suitable bearing so that it was free to rotate while restrained from tilting. In such an arrangement, the stator would then be mounted, for example, by means of a coil spring or other mounting which held it against rotation while allowing it to tilt. For example, in the embodiment shown in FIGURE 7, the rotor may be supported by means of a ball bearing, one race of which is fixed around its upper edge, thus allowing the rotor to rotate freely while holding it against tilting. This bearing would replace the central bearing shown in the drawing. The stator in such an arrangement will be supported by means of a coil spring attached between a fixed support and the upper surface of the stator which is thus prevented from rotating while being free to tilt. As this arrangement is an obvious alternative to that previously described, it is not proposed to describe it in further detail.

What I claim is:

1. A rotary device, utilizing the kinetic energy of a fluid, comprising, in combination, a circular cross section stator element having an axial extent; a circular cross section rotor element having an axial extent; said elements having a common axis of relative rotation and one of said elements being disposed within the other of said elements in such manner that said elements define, between their facing, substantially uninterrupted circular surfaces, when said axis is concentric with both elements, an annular space whose radial width is restricted over a portion of its axial length; means mounting said rotor element for tilting, relative to said axis, into engagement of an edge thereof with said stator element to deform said annular space into a crescent-shape space; said rotor element being freely rotatable about said axis; and means directing a fluid under pressure to flow axially between said elements through said crescent-shape space; whereby the decrease in fluid pressure on the downstream side of said restricted portion at the radially widest portion of said crescent-shape space will tend to tilt said rotor element away from said stator element, causing a progressive angular shift of said crescent-shape space with rolling of the edge of said rotor element about said stator element.

2. A rotary device, as claimed in claim 1, wherein said rotor element is constructed to provide for flow of fluid axially therethrough.

3. A rotary device, as claimed in claim 2, wherein said rotor element is formed with at least one fluid outlet orifice arranged to produce at least one jet of fluid which rotates as said rotor element rotates.

4. A rotary device, as claimed in claim 1, including a rotatable output element rotatable coaxially with said common axis; and means coupling said rotor element to said output element to rotate the latter.

5. A rotary device, as claimed in claim 1, wherein said elements define, between their facing substantially uninterrupted circular surfaces, when said axis is concentric with both elements, a second annular space whose radial width is restricted over at least a portion of its axial length, said second annular space being positioned downstream of said elements from the first mentioned annular space relative to the direction of fluid flow.

6. A rotary device, as claimed in claim 4, wherein said coupling means comprises a flexible shaft secured to said output element and supporting said rotor element.

7. A rotary device, as claimed in claim 1, wherein said rotor element is biased to rotate in one angular direction rather than the other angular direction by offsetting the point about which said rotor element may tilt to a small extent from said common axis.

8. A rotary device, as claimed in claim 1, wherein said rotor element is disposed within said stator element.

9. A rotary device, as claimed in claim 1, wherein said stator element is disposed within said rotor element.

References Cited by the Examiner

UNITED STATES PATENTS 2,872,104   2/1959   Cizinsky.

FOREIGN PATENTS 1,001,387   10/1951   France.
250,207   2/1927   Great Britain.
367,566   1/1939   Italy.
228,047   10/1943   Switzerland.

EDGAR W. GEOGHEGAN, *Primary Examiner.*

MARTIN P. SCHWADRON, *Examiner.*

E. A. POWELL, *Assistant Examiner.*